H. T. BRUNS.
VALVE.
APPLICATION FILED JAN. 24, 1911.
1,005,409.
Patented Oct. 10, 1911.
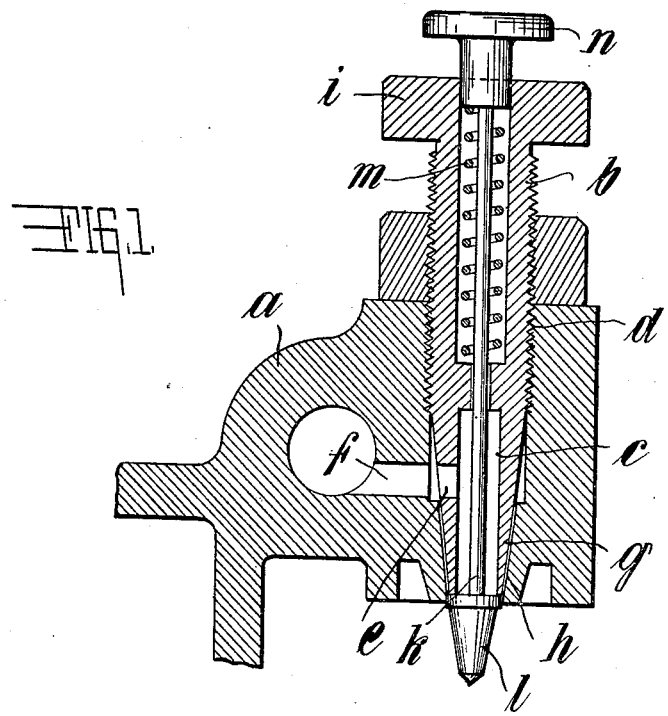
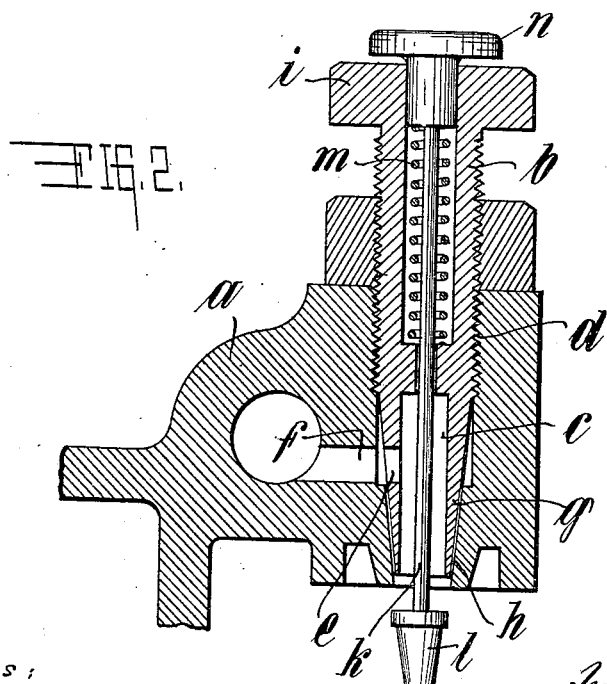
Witnesses:
L. H. Staaden.
Anna Hoyer.
Inventor:
Hans Th. Bruns,
by Alfred Luden, atty.

UNITED STATES PATENT OFFICE.

HANS TH. BRUNS, OF NUREMBERG, GERMANY.

VALVE.

1,005,409.

Specification of Letters Patent.   Patented Oct. 10, 1911.

Application filed January 24, 1911.   Serial No. 604,495.

*To all whom it may concern:*

Be it known that I, HANS TH. BRUNS, a subject of the King of Prussia, residing at Nuremberg, in the Kingdom of Bavaria and German Empire, have invented a Valve, of which the following is a specification.

This invention relates to an improved valve for lubricating pumps and the like and has for its object to provide a valve for both a continuous and a temporary oil supply. For this purpose the improved valve comprises two valve bodies and two spindles arranged one within the other, both being displaceable in the direction of their length, one of these spindles serving for the adjustment of the continuous oil supply and the other spindle serving for supplying a larger quantity of oil at certain periods.

As pumps of the kind referred to periodically use a larger quantity of the lubricant than is supplied by the continuously acting valve it is necessary, in order to prevent irregularities or stoppage in the running, to supply a larger quantity of lubricant at certain periods to bring the supply up to the requisite amount. By means of the valve according to my invention, whenever the consumption of lubricant becomes greater than the amount supplied by the continuously acting valve, it is at once possible to supply a larger quantity of lubricant without the necessity of fitting the member providing for this additional supply at a separate place which would restrict the available space.

A valve embodying my present invention is illustrated by way of example in the accompanying drawing in which:

Figure 1 is a vertical section through the valve adjusted for a given constant supply of lubricant. Fig. 2 is a vertical section through the valve at the moment of hand operation for the purpose of producing a periodically increased supply of lubricant.

In the drawing a spindle *b* bored axially at *c* is mounted in the valve casing *a*; this spindle is displaceable or adjustable in its axial direction. For this purpose the spindle *b* is preferably screw threaded and engages a corresponding thread *d* provided in the valve casing *a*.

The spindle *b* has a conical body *g* having a port *e* which communicates with the passage *f* for supplying the lubricant, such as oil or the like, to the cavity or bore *c* in spindle *b*. The lower end or body *g* of the spindle *b* fits into a corresponding conical bore in the casing *a*. Owing to this conical formation of the spindle end *g* and casing *a* it is possible, by displacing or adjusting the spindle *b* in the direction of its axis to provide an annular space *h* of a variable cross sectional area between the spindle end *g* and the conical bore in the casing, so that the oil can constantly flow out from *e* through said annular space *h* in the form of continuous drops or a thin stream, the quantity being determined by the adjustment of the spindle *b* which may be screwed up and down by means of its head *i*. A spindle *k* passes through the bore *c* in the spindle *b*, carrying on its lower end a conically shaped body *l*. This body *l* is intended to close the lower end of the bore *c* in the spindle *b*, thus collecting the oil flowing down through the port *e* into the chamber or bore *c* and at the same time serving to conduct on its outer surface by way of adhesion the oil that issues from the annular space *h* between the casing *a* and the cone of the spindle *b*. The spindle *k* is acted upon by a spring *m* in such a manner that the conical body *l* provided on the lower end of the spindle is constantly pressed against the end *g* of the spindle *b*, thus closing the bore *c*. If, however, pressure is exerted, by hand for example, on the button *n* of the spindle *k*, the latter is displaced in the manner indicated in Fig. 2 thereby opening the mouth of the bore *c* so that in this position of the parts a larger quantity of oil is supplied to the pump. When the pressure on the button *n* of the spindle *k* is again released the spindle at once will return to its initial position shown in Fig. 1 under the influence of the spring *m*, whereupon the body *l* will again close the mouth of the bore *c*. The parts being in this position the oil will then drip only through the annular space *h*. By adjusting the spindle *b* and thus enlarging or reducing the said annular space *h*, the continuous supply of oil can be increased or diminished at will.

I claim:—

1. In a valve for lubricating pumps or the like, having a restricted passage for a continuous supply and a larger passage for a temporary increased supply, the combination of an adjustable spindle, provided with a valve body adapted to vary said restricted passage and thereby the continuous supply, a second spindle also provided with a valve body, and a spring adapted to normally hold the valve body of said second spindle in a position to close the larger passage.

2. In a valve for lubricating pumps or the like, having a restricted passage for a continuous supply and a larger passage for a temporary increased supply, the combination with the valve casing, of a screw spindle adapted to be screwed up or down and provided with a valve body for varying said restricted passage, a second spindle, also provided with a valve body and a spring adapted to normally hold the valve body of said second spindle in a position to close the larger passage.

In testimony whereof I have signed my name to this specification in the presence of two subscribing witnesses.

HANS TH. BRUNS.

Witnesses:
RALPH W. DOX,
ELISABETH HELLMUTH.

Copies of this patent may be obtained for five cents each, by addressing the "Commissioner of Patents, Washington, D. C."